DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 712

T869,006

PHOTOTROPIC COMPOSITIONS

Gordon Clay Newland, P.O. Box 511, Kingsport, Tenn. 37662, and Melvin S. Bloom, Kodak Park, Rochester, N.Y. 14650

Continuation-in-part of application Ser. No. 563,028, July 6, 1966. This application May 3, 1968, Ser. No. 726,559

Int. Cl. C08b *21/16;* C08f *29/02;* G02b *1/04*

U.S. Cl. 106—176

No Drawing. 10 Pages Specification

A phototropic composition comprising a cellulose ester or a polyolefin and an effective amount, such as from about 0.01% to about 5% by weight of the resin of the phototrope 3′,3′ - dimethylspiro(2H - 1 benzopyran - 2,2′-indoline) having the formula

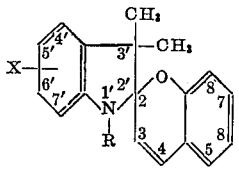

wherein R is an alkyl radical containing 4 to 20 carbon atoms, X is one or more substituents selected from the group consisting of hydrogen, nitro, methoxy, carboxy, methoxycarbonyl, methyl sulfonyl, and cyano, which are substituted in one or more of the 4′, 5′, 6′, or 7′ positions, any Y is one or more substituents selected from the group consisting of nitro, methoxy, cyano, hydroxyl and amino, which are substituted in one or more of the 5, 6, 7 or 8 positions, wherein the phototrope is useful as a light filtering material in the cellulose ester or in the polyolefin.